Dec. 15, 1953    J. A. SCHWARZ    2,662,753
FOOD MIXER
Filed Dec. 8, 1951    3 Sheets-Sheet 2
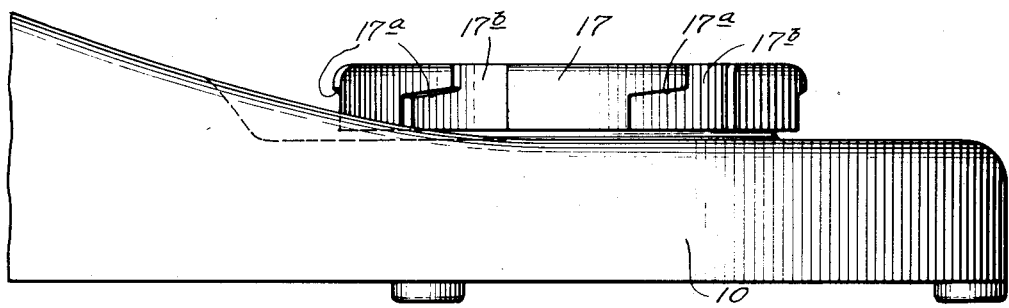
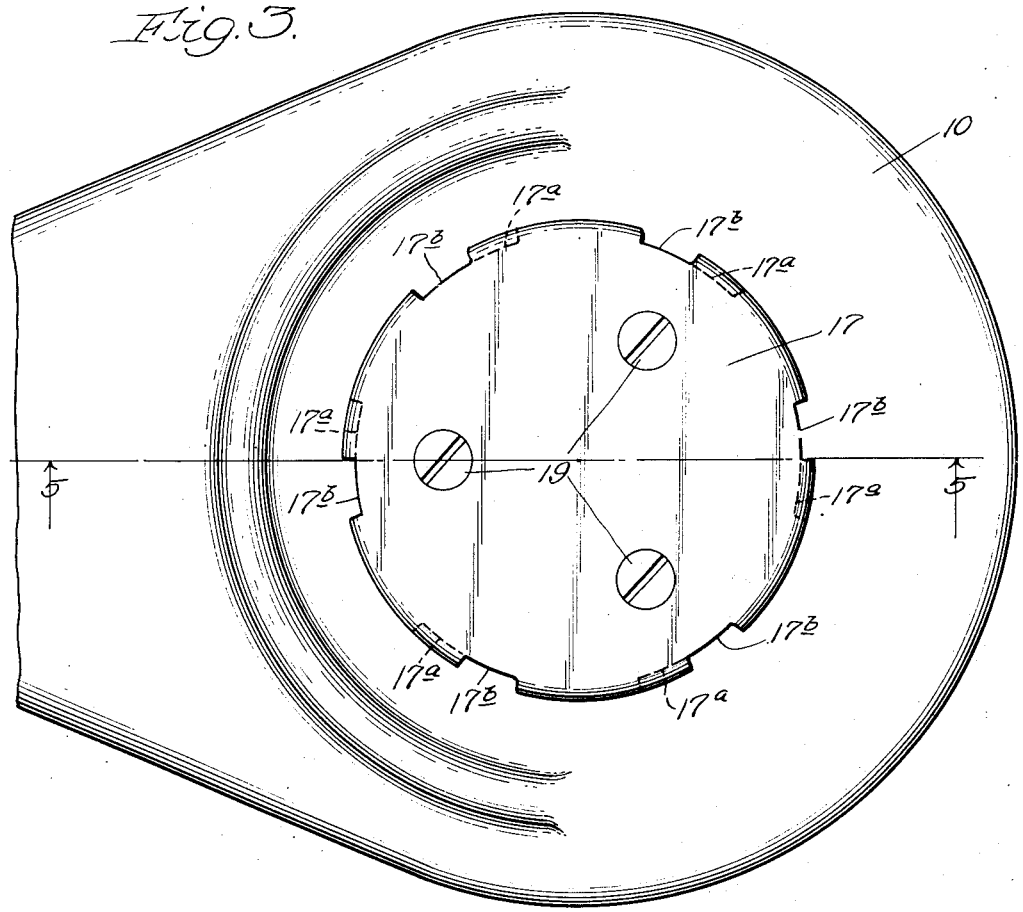
Inventor:
Joseph A. Schwarz,
By Schroeder, Merriam,
Hofgren & Brady, Attys.

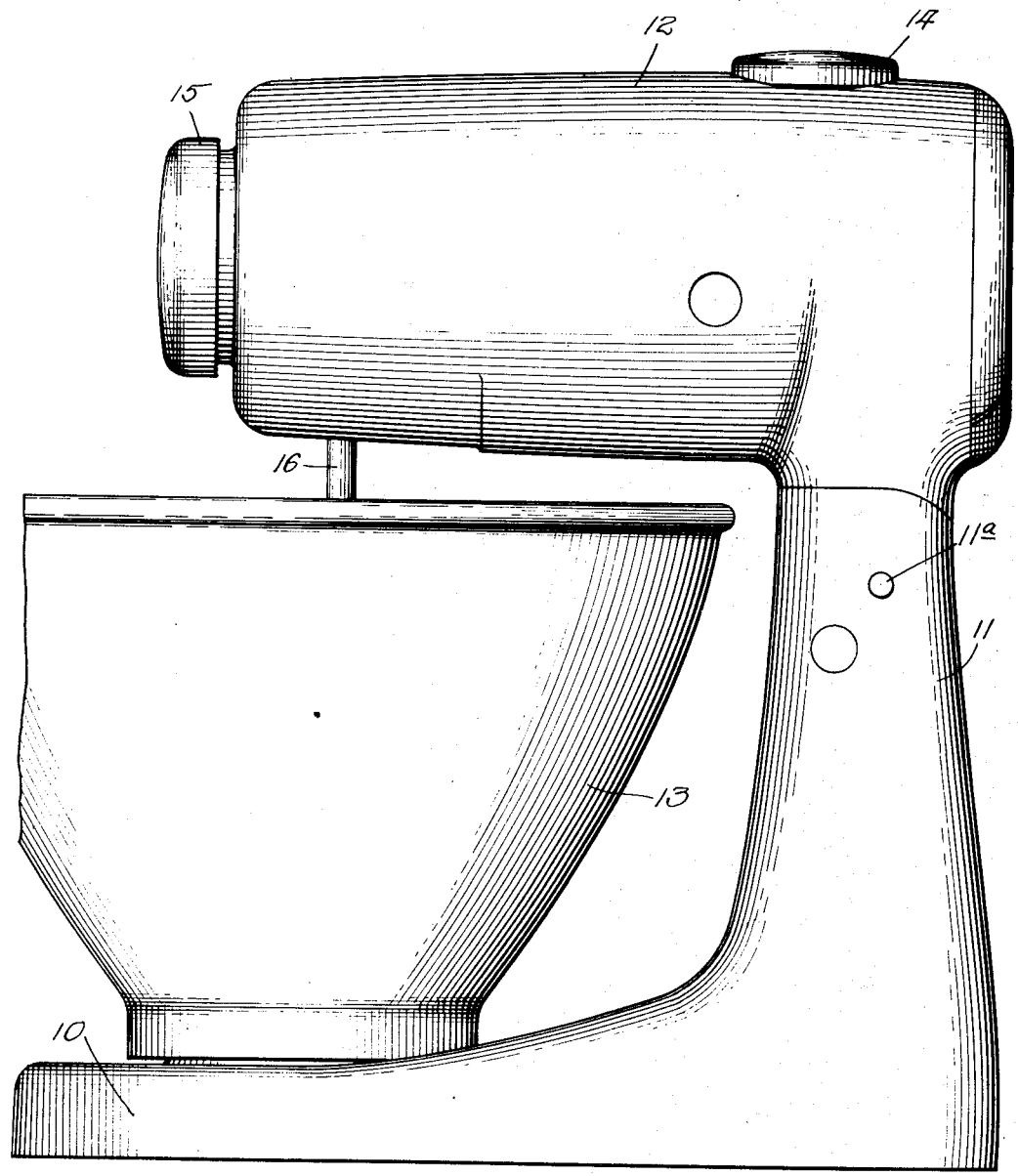

Dec. 15, 1953  J. A. SCHWARZ  2,662,753
FOOD MIXER
Filed Dec. 8, 1951  3 Sheets-Sheet 3

Inventor:
Joseph A. Schwarz,
By Schroeder, Merriam,
Hofgren & Brady, Attys.

Patented Dec. 15, 1953

2,662,753

UNITED STATES PATENT OFFICE 2,662,753

FOOD MIXER

Joseph A. Schwarz, Chicago, Ill., assignor to Birtman Electric Company, a corporation of Illinois Application December 8, 1951, Serial No. 260,634

2 Claims. (Cl. 259—85)

1

This invention relates to a food mixer having a rotatable platform and relates particularly to such a food mixer including a platform and releasably attached bowl rotatable in one direction during the mixing operation and catch apparatus carried by the platform to prevent reverse rotation of the platform.

In certain types of food mixers the bowl adapted to contain the material to be mixed is removably locked on a rotatable platform by turning the bowl in one direction with respect to the platform. During the mixing operation the bowl and platform are rotated in this direction by the rotating beater blade or blades. Sometimes a brake mechanism is attached to the platform to govern the speed thereof.

At the end of the mixing operation it is necessary to disconnect the bowl from the platform so that the mixed contents may be removed from the bowl. This removal of the bowl requires reverse rotation of the bowl with respect to the platform. As the two are tightly joined together by this time because of the beater or beaters applying a force to the bowl that tends to wedge or lock the bowl tightly on the platform, it is often difficult to unlatch the bowl from the platform. In the present invention this problem is solved by providing a catch member carried by the platform and a stop means adjacent to the catch member. The catch member is engageable with the stop means upon initial reverse rotation of the bowl and platform to prevent further reverse rotation of the platform and thus hold it while the bowl is unlatched therefrom. This permits easy removal of the bowl from the platform by merely grasping the bowl and turning it slightly in a direction opposite to the normal direction of rotation.

Figure 4:
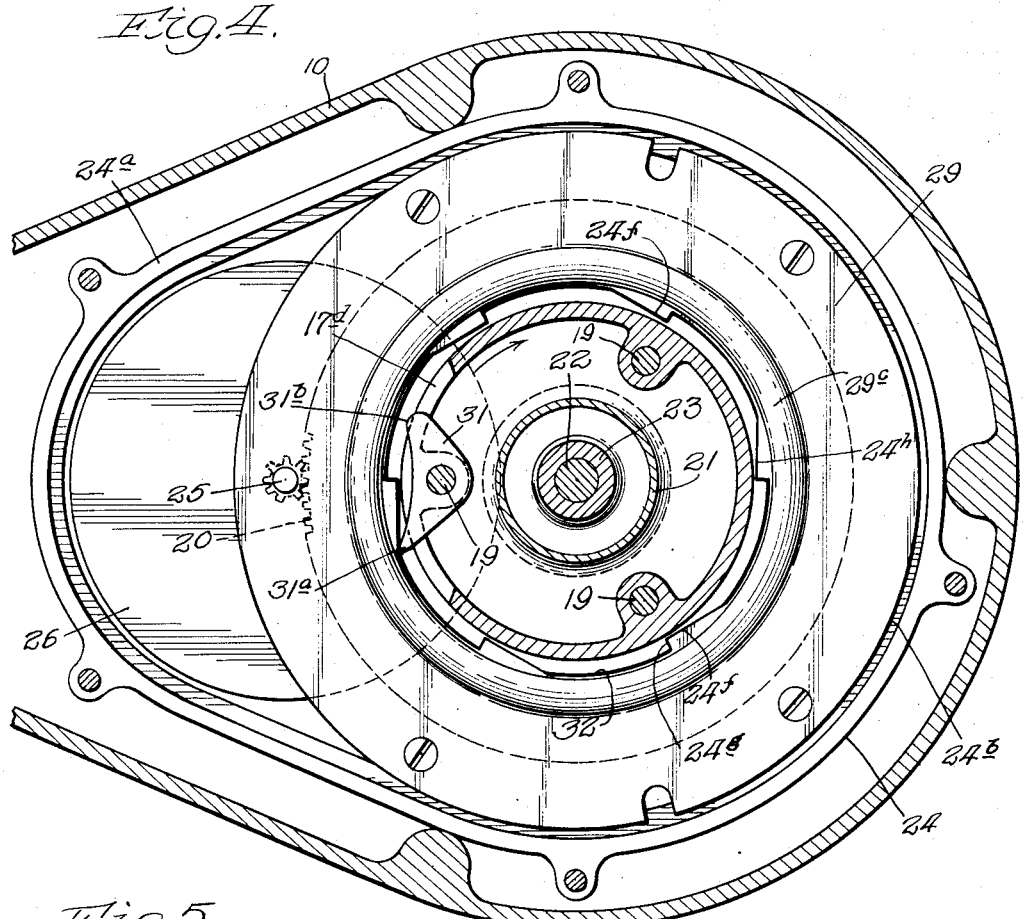

The invention will be described as related to the embodiments shown in the accompanying drawings, in which:

Fig. 1 is a fragmentary side elevation of an electric food mixer and bowl combination embodying this invention, with the bowl in place on the mixer platform; Fig. 2 is a fragmentary enlarged side elevation of a portion of the mixer base showing the rotatable platform; Fig. 3 is a fragmentary plan view of the mixer section and platform of Fig. 2; Fig. 4 is a horizontal section through a portion of the mixer base, taken substantially along line 4—4 of Fig. 5; and Fig. 5 is a fragmentary vertical section through a portion of the mixer base and platform taken substantially along line 5—5 of Fig. 3 and showing the bowl locked in place on the platform.

In the embodiment shown in the accompanying drawings, the food mixer comprises a base 10, a substantially vertical standard 11, a horizontal motor housing 12 rotatable about a pivot 11a adjacent the top of the standard and a bowl 13

2 releasably attached in place on the base 10. The motor housing 12 includes the usual speed control knob 14 and a cap 15 covering a power shaft for an attachment. The motor housing 12 is rotatably attached to the standard 11 at one end and adjacent the other end there is provided a beater including a shaft 16 extending downwardly into the bowl 13.

Figure 5:
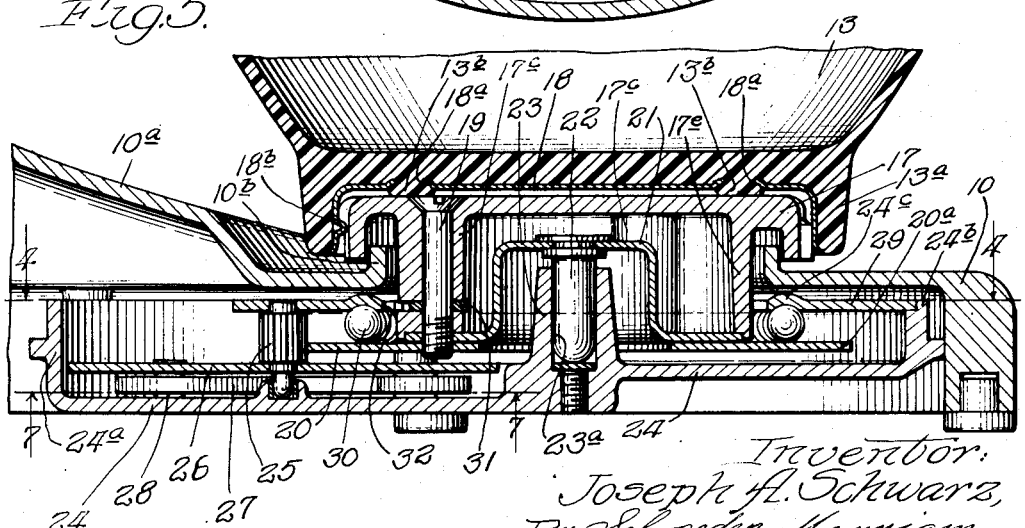

As is shown most clearly in Fig. 5, the bowl 13 is releasably attached to a rotatable platform 17 located on the base 10 and rotatable relative thereto. The bowl 13 which is described and claimed in my co-pending application Serial No. 247,317, filed September 19, 1951, is provided with a concave bottom portion 13a having a raised lower surface of inverted cup shape provided with a similarly shaped metal insert 18. This metal insert which is shown, described and claimed in my above-mentioned copending application is provided with a plurality of openings 18a through which extend small portions 13b of the material used to make the base of the bowl 13. This material is preferably a synthetic plastic and the combination of the plurality of holes 18a and bowl portions 13b serve to distribute the stresses in the bottom part of the bowl and prevent breakage thereof.

The rotatable platform 17 is provided with a plurality of inclined cut-away surfaces 17a on its periphery adapted to be engaged by similarly inclined inwardly projecting portions 18b on the inner surface of the insert 18. The portions 17a and 18b on the platform and insert, respectively, provide a screw type connection between the bowl and the platform. Thus, in attaching the bowl to the platform the projections 18b on the bowl are forced downwardly through the spaces 17b to below the level of the inclined portion 17a and then the bowl turned in a clockwise direction to engage the portions 18b with the inclined surfaces 17a.

The base 10 of the mixer is hollow and is provided with an upper wall 10a having a circular opening defined by an upwardly extending annular flange 10b. The platform 17 is located within this flange 10b and is attached by means of three screws 19 located in three legs 17c to a disc 20. This disc 20 also carries on its top surface an inverted cup member 21 provided at its center with a downwardly extending spindle 22 of substantially circular cross section. This spindle 22 is rotatable within an opening 23a that is within an upwardly extending part 23 of a bottom closure for the base 10 of the mixer.

With the above described construction the platform 17, and thus the bowl 13, is rotatably supported by the spindle 22 for rotation about the vertical axis that coincides with the axis on the spindle 22. This rotation is caused by the rotating beater operating on the material within the bowl 13 and thus on the bowl itself. In order to govern the speed of rotation and thus prevent excessive speeds, a brake mechanism is provided. This brake mechanism is of the type shown and described in a co-pending application of Charles H. Sparklin, Serial No. 696,750, filed September 13, 1946.

In the embodiment shown, the disc 20 is circular and is provided with teeth 20a at its outer edge engaging a toothed spindle 25. This spindle is thus rotated by rotation of the disc 20 and is attached to a second disc 26 which rotates at a considerably faster speed than does the first disc 20. This second disc 26 has rotatably attached thereto a pair of arcuate lever arms 27 of which one is shown in Fig. 5. Each lever arm is rotatably attached to the disc 26 at one end of the arm by means of a spindle 28 and carries a brake shoe at the other end. These brake shoes bear against the inner wall of the annular portion 24a forming a part of the closure plate 24. The entire brake mechanism depends on centrifugal force urging the lever arms 27 outwardly against the annular portion 24a.

In order that the platform 17 will rotate about a fixed axis, the bottom closure plate 24 is provided with a top plate 29 spaced from the substantially parallel to the disc 20. This top plate which is fastened securely to the upper rim 24b of the closure 24, is provided with an annular raised part 24c that forms a raceway for a series of ball bearings 30 located between the disc 20 and plate 29.

With the construction as described, the bowl may be easily attached to the platform 17 by merely lowering the projections 18b on the bottom of the bowl through the spaces 17 on the platform and turning the bowl relative to the platform until these projections 18b slide under the inclined surfaces 17a. When this has been done, the bowl and platform are locked together for rotation as a unit. The force exerted by the beater or beaters on the material within the bowl causes rotation of the bowl and platform, this rotation being braked by the above described brake mechanism.

With this construction it has been found difficult to remove the bowl from the platform because reverse rotation of the bowl also normally causes reverse rotation of the platform so that the projections 18b on the bowl remain wedged under the surfaces 17a. In order to overcome this, the present invention provides a catch member 31 carried by the platform 17 and rotatable therewith and a stop means 32 adjacent to the catch member and engageable therewith upon initial reverse rotation of the bowl and platform to prevent further reverse rotation of the platform so that the bowl may be removed. In the embodiment shown, and particularly disclosed in Figs. 4 and 5, the catch member 31 is rotatably mounted around a bolt 19 used to attach the platform to the disc 20. This catch member fits within a cut-out portion 17d in the depending inner skirt 17e of the platform as shown in Fig. 4. The catch member is of generally crescent shape and is oscillatably mounted on the platform about an axis adjacent the center of the crescent. The two ends of the crescent shaped catch member project generally away from the axis of rotation of the platform so as to be engageable with the stop means. The stop means, as shown most clearly in Fig. 4, includes a plurality of circularly arranged stop members 24f adjacent the path of rotation of the catch member 31. In the embodiment shown each stop member 24f projects generally toward the axis of rotation of the platform and has a part 24g engageable with the end 31a of the catch member on initial reverse rotation of the bowl in the direction opposite the arrow in Fig. 4 to prevent further reverse rotation of the platform and permit removal of the bowl from the platform. As shown in Fig. 4 the leading edge 24h of each stop member 24f is inclined at a relatively small angle with respect to the remainder of the stop means 32. The following edge part 24g engaged by the end 31a of the catch member is, in contrast to this, relatively blunt so as to stop reverse rotation. With this construction, the leading edge 24h engages a relatively blunt end 31b of the crescent shaped catch member 31 on normal rotation of the bowl and platform to move the relatively sharp opposite crescent end 31a into position so that it is always located in such a position that it will engage a stop member 24f. As can be seen, the stop members 24f and the catch member 31 do not interfere with normal rotation of the bowl and platform during the mixing operation, but only serve to prevent rotation of the platform when the platform is rotated in a reverse manner.

As is shown in the drawings, the catch member 32 is formed in the cut-out central opening of the top plate 29 so that the stop members 24f are actually inwardly projecting teeth. This construction serves to save space and weight and simplifies the locating of the catch member 31.

Having described my invention as related to the embodiment shown in the accompanying drawings, it is my intention that the invention be not limited by any of the details of description unless otherwise specified but rather be construed broadly within its spirit and scope as set out in the accompanying claims.

I claim:

1. In a food mixer, a rotatable platform, a mixer bowl, a friction interlock for locking the bowl on the platform against rotation of the bowl in its normal driven direction, a base having a circular opening into which the platform extends, the edge portion of the platform defining the opening being provided with a plurality of stop members around the platform forming a ratchet, and a pawl carried by the platform and engaging a tooth upon initial reverse rotation of the bowl and platform to prevent further reverse rotation of the platform to aid in separating the friction interlock.

2. The food mixer of claim 1 wherein the pawl is of generally crescent shape and oscillatably mounted on the platform adjacent to the center of the crescent with its two ends projecting generally away from the axis of rotation of the platform, each tooth of the ratchet having an edge portion engageable with a part of the pawl on initial reverse rotation to move the pawl into position to engage the next tooth.

JOSEPH A. SCHWARZ.

References Cited in the file of this patent

UNITED STATES PATENTS

| Number | Name | Date |
|---|---|---|
| 1,733,291 | Aastrup | Oct. 29, 1929 |
| 2,013,765 | Richardson | Sept. 10, 1935 |
| 2,075,851 | Johnson | Apr. 6, 1937 |
| 2,543,482 | Williams | Feb. 27, 1951 |